W. W. Dutcher.
Shuttle Motion.
No. 454. Reissued Apr. 21, 1857.
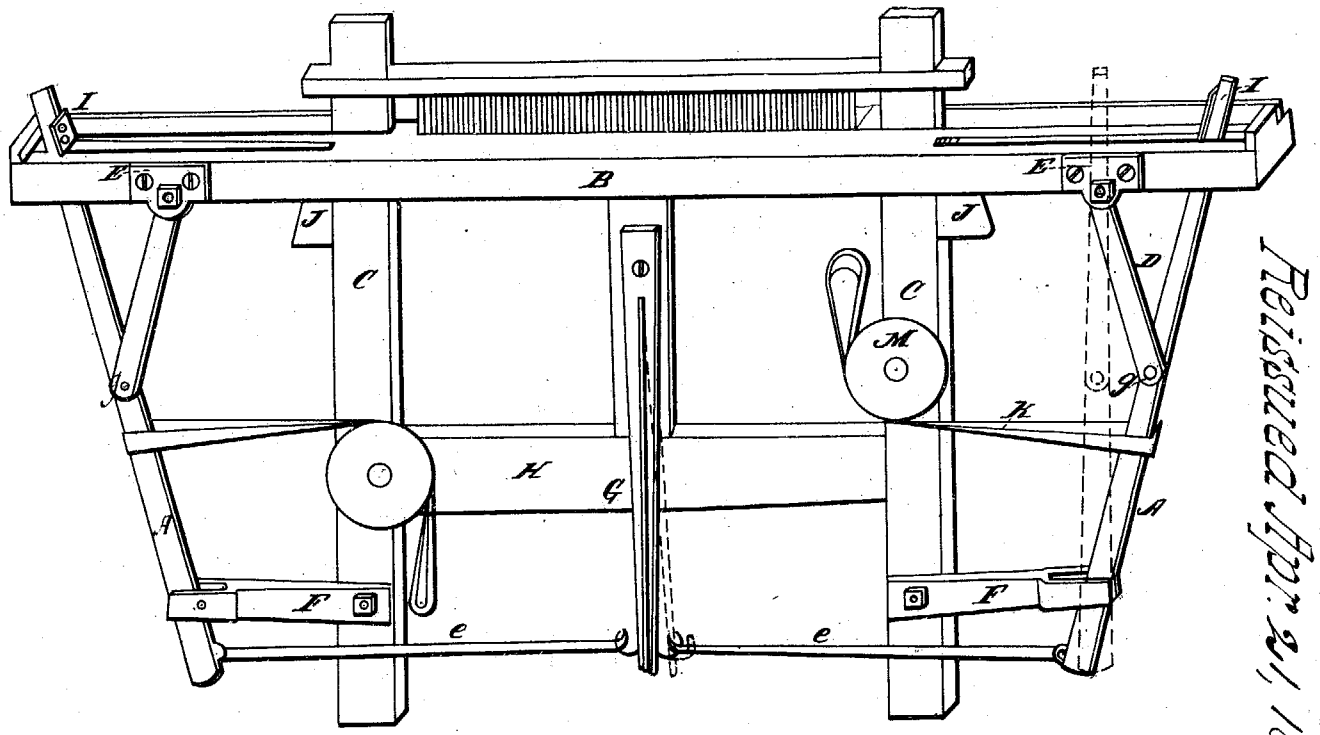
N. PETERS, PHOTO-LITHOGRAPHER, WASHINGTON, D. C.

UNITED STATES PATENT OFFICE.

WARREN W. DUTCHER, OF MILFORD, MASSACHUSETTS.

IMPROVEMENT IN LOOMS.

Specification forming part of Letters Patent No. 4,606, dated June 27, 1856; Reissue No. 454, dated April 21, 1857.

*To all whom it may concern:*

Be it known that I, WARREN W. DUTCHER, late of Bennington, in the county of Bennington and State of Vermont, but now of Milford, in the State of Massachusetts, have invented a new and useful Improvement in Looms; and I do hereby declare that the following is a full, clear, and exact description of the principle or character thereof which distinguishes it from all other things before known, and of the manner of making, constructing, and using the same, reference being had to the accompanying drawing, making part of this specification, which is a perspective view of my improvement applied to the lay of a loom.

The usual or a very common method employed of driving the shuttle is by means of pickers that slide on rods attached to the shuttle-boxes, and driven by staffs connected with them by means of the leather cords. An attempt has been made to improve this by some, consisting in dispensing with the pickers and driving the shuttle by the ends of the staffs.

To avoid the difficulty arising from the fact that the end of the staff which strikes the shuttle describes a circle in its vibration, each staff, instead of being made to turn on a joint at its lower end, is provided with a rocker to rock on a platform, the curve of the rocker being such as to make that end of the staff which strikes the shuttle move in a line parallel with the race-board.

In order to keep the rockers on the platform, links jointed to the rockers and to the platforms have been employed. These, however, are objectionable, as they necessarily cause the rockers to slide on the platforms, and do not effectually keep them thereon. This obvious defect I avoid by my improvement, which consists in connecting each driving-staff with the shuttle-box by means of a joint-link jointed to the shuttle-box and to the staff about the middle of the length of the latter, which at its lower part is made to rest against a roller, and in such manner as to admit of the staff being moved up and down or longitudinally, the roller answering the purpose of a fulcrum for the staff to rest against, which being drawn backward by means of a strap attached to a spring and to the end of the staff below the roller. The lower end of the two staffs are respectively connected to the prongs of a bifurcated spring, the tension of which is so regulated that when one staff is thrown back the spring shall have strength enough only to carry back the other staff about half-way, where it should remain until the shuttle is next driven back, and distends the spring and causes the staff to move back with the shuttle.

In the accompanying drawing, B represents the race-board; C C, the lay-swords, and H the cross-bar connecting them in the usual manner.

A A are the driving or wag staffs, the upper parts of which pass through and move freely in slots made through the bottoms of the shuttle-boxes. That part of each staff which is intended for striking the shuttle should be armed with some appropriate elastic material, as seen at I I. Toward the lower end of each staff such staff plays between the prongs of a forked arm or bracket, F, and rests against a roller, *i*, so as to admit of the staff playing up and down freely during its vibrations or lateral movements. Each of these staffs is connected with its shuttle-box by a joint-link, D, jointed both to the shuttle-box E and to the staff, so that as the upper end of the staff vibrates it may be kept in a line parallel with the race-board, and hence in the line of the motion of the shuttle. The lower ends of these staffs are connected, respectively, by cords *e e* with the prongs of a forked spring, G, the tension of which tends to draw the upper ends of the staffs away from each other.

The staffs by any of the known means can be operated so as to drive the shuttle across the race-beam. For this purpose each may have a strap, K, attached to it and to a treadle or lever, the strap being passed over a roller, M. Any other convenient mode of accomplishing the same may be substituted, if desirable. The interposed spring G should turn freely on a pin or fulcrum at *h*, so as to act with equal force on each of the two staffs in any position in which they may be placed. When they are both thrown back, as represented in the drawing, the spring is not under tension, and if one of the staffs is placed in a vertical position, as indicated by dotted lines, the tension should not be sufficient to carry it back; but as the other staff is moved toward it in driving the shuttle the tension of the spring is increased, and then moves it back as the shuttle approaches it. This gradually arrests the momentum of the shuttle and avoids much of the jar which otherwise would take place.

It will be obvious from the foregoing that any kind of spring which will operate in like manner may be substituted for the one represented in the drawing.

I do not claim guiding a wag-staff by means of a rocker and stand, my invention not employing any rocker or rocking motion for each wag-staff.

What I do claim is—

1. Supporting the wag-staff at its lower end so that it may slide longitudinally, in connection with supporting it in other respects by a joint-link or its equivalent, applied so as to cause that part of the staff which strikes the shuttle to move in a line parallel or about parallel to the race-beam, as specified.

2. Connecting the lower end of the two staffs below their fulcra by means of a spring having an intermittent action for drawing them back, in combination with the application of a positive motion above for driving the shuttle, whereby the returning-staff aids in arresting the momentum of the shuttle, substantially as herein described.

WARREN W. DUTCHER.

Witnesses:

GEO. G. PARKER,

T. B. THAYER.